(12) United States Patent
Meyer et al.

(10) Patent No.: US 10,890,466 B2
(45) Date of Patent: Jan. 12, 2021

(54) ANGULAR SENSOR WITH ANNULAR WAVEGUIDE AS MATERIAL MEASURE

(71) Applicant: Siemens Aktiengesellschaft, Munich (DE)

(72) Inventors: Martin Meyer, Nuremberg (DE); Jürgen Zettner, Veitsbronn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/762,417

(22) PCT Filed: Oct. 24, 2018

(86) PCT No.: PCT/EP2018/079100
§ 371 (c)(1),
(2) Date: May 7, 2020

(87) PCT Pub. No.: WO2019/091778
PCT Pub. Date: May 16, 2019

(65) Prior Publication Data
US 2020/0378805 A1    Dec. 3, 2020

(30) Foreign Application Priority Data

Nov. 8, 2017 (EP) .................................. 17200617

(51) Int. Cl.
*G01D 5/48* (2006.01)
*G01B 15/00* (2006.01)
(Continued)

(52) U.S. Cl.
CPC ............... *G01D 5/48* (2013.01); *G01B 15/00* (2013.01); *B60C 23/0416* (2013.01); *G01S 5/04* (2013.01)

(58) Field of Classification Search
CPC ............ B60C 23/0416; B60C 23/0489; B60C 23/0488; B60C 23/064; B60G 2204/113;
(Continued)

(56) References Cited

U.S. PATENT DOCUMENTS

| | | | |
|---|---|---|---|
| 6,369,748 B1* | 4/2002 | Uehara | G01S 13/34 342/104 |
| 6,532,831 B2* | 3/2003 | Jin | G01L 3/105 73/862.331 |

(Continued)

FOREIGN PATENT DOCUMENTS

| | | |
|---|---|---|
| DE | 10 2006 021 206 A1 | 11/2007 |
| DE | 10 2006 052 790 A1 | 5/2008 |

(Continued)

OTHER PUBLICATIONS

Lindner S et al: "Dual tone approach for unambiguous six-port based interferometric distance measurements". IEEE—MTTS International Microwave Symposium. Digest, IEEE, US. pp. 1-4, XP032546243, ISSN: 0149-645X, DOI: 10.1109/MWSYM.2013. 6697581, [gefunden am Dec. 27, 2013], col. 1-3 and Fig. 1; 2013.

(Continued)

*Primary Examiner* — Olumide Ajibade Akonai
(74) *Attorney, Agent, or Firm* — Henry M. Feiereisen LLC (57) ABSTRACT

A rotating element is mounted in a base body for rotation about an axis of rotation. An excitation circuit generates an excitation signal. A divider circuit divides the excitation signal into a base signal supplied to an evaluation circuit and into an outgoing signal supplied to a transceiving antenna. A waveguide circulates in an annular manner about the axis of rotation. The rotating element comprises a termination element protruding into the waveguide and has a reflective side. The transceiving antenna emits an electromagnetic signal into the waveguide propagating in two directions which is (Continued)

reflected from the reflective side and returned to and received by the transceiving antenna which generates in response a receiving signal supplied to the evaluation circuit which determines a position of rotation of the rotating element in relation to a reference position of rotation by evaluating the base signal and receiving signal in a resolution region.

10 Claims, 4 Drawing Sheets

(51) Int. Cl.
*B60C 23/04* (2006.01)
*G01S 5/04* (2006.01)

(58) Field of Classification Search
CPC ........ G01S 13/44; G01S 7/4026; G01S 13/88;
G01S 5/04; G01S 5/0221; G01S 5/0205;
B60T 8/1725; G06F 11/30; G06F 1/16;
H03L 7/0992; H04B 17/23; H04B 17/27;
H04B 17/318; G06T 7/70; H04N 7/18;
H04W 24/08; G01D 5/48; G01B 15/00
See application file for complete search history.

(56) References Cited

U.S. PATENT DOCUMENTS

| | | | | | |
|---|---|---|---|---|---|
| 6,774,642 | B2* | 8/2004 | Lin | ..................... | G01D 5/2405 |
| | | | | | 324/207.12 |
| 7,053,602 | B2* | 5/2006 | Jin | ........................ | G01D 5/202 |
| | | | | | 324/207.16 |
| 8,729,887 | B2* | 5/2014 | Suzuki | ................... | H02K 24/00 |
| | | | | | 324/207.16 |
| 2004/0050180 | A1* | 3/2004 | Abe | ..................... | G01D 5/2053 |
| | | | | | 73/862.331 |
| 2011/0175769 | A1* | 7/2011 | Lee | .......................... | H01Q 1/48 |
| | | | | | 342/175 |
| 2013/0207675 | A1* | 8/2013 | Francescon | .............. | G01B 7/02 |
| | | | | | 324/683 |
| 2014/0232417 | A1 | 8/2014 | Halder et al. | | |
| 2014/0347035 | A1 | 11/2014 | Halder et al. | | |
| 2015/0159988 | A1* | 6/2015 | Essawy | ..................... | G01D 5/20 |
| | | | | | 324/207.25 |
| 2017/0227632 | A1* | 8/2017 | Takayama | ............... | G01S 13/95 |

FOREIGN PATENT DOCUMENTS

| | | |
|---|---|---|
| DE | 10 2013 202 765 A1 | 8/2014 |
| DE | 10 2013 209 364 A1 | 11/2014 |

OTHER PUBLICATIONS

Gabor Vinci et al: "Wide-range, dual six-port based Direction-Of-Arrival detector", Microwave Conference (GEMIC), 2012 the 7th German, IEEE, pp. 1-4, XP032169150, ISBN: 978-1-4577-2096-3, col. 1-2 and Fig. 1; 2012.

PCT International Search Report and Written Opinion of International Searching Authority dated Jan. 23, 2019 corresponding to PCT International Application No. PCT/EP 2018/079100 filed Oct. 24, 2018.

* cited by examiner

ANGULAR SENSOR WITH ANNULAR WAVEGUIDE AS MATERIAL MEASURE

CROSS-REFERENCES TO RELATED APPLICATIONS

This application is the U.S. National Stage of International Application No. PCT/EP2018/079100, filed Oct. 24, 2018, which designated the United States and has been published as International Publication No. WO 2019/091778 A1 and which claims the priority of European Patent Application, Serial No, 17200617.3, filed Nov. 8, 2017, pursuant to 35 U.S.C. 119(a)-(d).

BACKGROUND OF THE INVENTION

The present invention is based on an angular sensor, wherein the angular sensor has a base body, wherein a rotating element is mounted in the base body such that the rotating element can be rotated about an axis of rotation.

Angular sensors are necessary for a plurality of applications. For example, in electric machines the mechanical angle of rotation must be measured for positioning tasks and as feedback for current control. For example, optical, magnetic, inductive or capacitive angular sensors are used for servo drives as a rule. In many cases, the angular sensors are independent components in which the base body of the angular sensor is connected to a base body of the machine whose position of rotation is to be detected and the rotating element of the angular sensor is connected to a rotating shaft of the machine. In some cases, the angular sensors are integral components of the machine.

Irrespective of whether one approach or another is taken, the angular sensors always consist of a detection unit which scans a material measure. The detection unit is arranged on the base body of the angular sensor, the material measure on the rotating element of the angular sensor. It is possible that the angular sensor itself determines the position of rotation and transmits it to a controller. Alternatively, the angular sensor can forward raw signals—for example, sine and cosine signals—from which another device, for example, the control mentioned, then determines the position of rotation.

The known angular sensors have various disadvantages. Thus, for example, optical, high-precision angular sensors are cost-intensive since as a rule a highly accurate mounting of the detection unit relative to the material measure is required. In the case of the embodiment as an integrated angular sensor, such a sensor is susceptible to dirt and must be encapsulated in an expensive manner by the manufacturer of the machine.

The requirement for small latency times for use in the control requires rapid physical measurement principles and evaluation methods.

The material measures must be produced in a costly manner in the range of 18 bits and more for a high level of accuracy, usually in microstructure technology as the structure sizes become increasingly smaller as the accuracy class increases. This applies equally to an embodiment of the material measure as a coded multipole magnetic wheel or multipole gearwheel or as an inductive or capacitive printed circuit board structure or optical glass or plastic disk with structures to be scanned in a transmissive or reflective manner in the micrometer range.

Furthermore, the material measures should become smaller and smaller in order to minimize the passive installation space which does not serve the actual purpose of the machine (for example, the application of a torque).

Conventional material measures are scanned by means of a scanning unit, in some cases also by means of a plurality of scanning units. The coding tracks of the material measures are usually arranged in a small-scale manner in parallel, in series or in a circular manner as so-called Vernier coils.

Measuring methods and measuring arrangements are also known within the scope of the linear distance measurement which use a phase-measuring radar technology in a waveguide in order to detect distances of several meters with a positioning resolution of a few micrometers during positioning tasks. Purely by way of example, reference may be made to DE 10 2013 209 364 A1 and to DE 10 2013 202 765 A1. Likewise, reference may be made to DE 10 2006 021 206 A1 and DE 10 2006 052 790 A1. Such measuring arrangements comprise a sensor for receiving an electromagnetic wave and a guide part for guiding the electromagnetic wave. The guide part is designed as an elongated waveguide. It is preferably made of metal or has a metallic coating. The guide part has a slot in the longitudinal direction which serves to guide the electromagnetic wave. The evaluation of the received signal can, for example, be carried out using the so-called 6-port circuit.

The object of the present invention is to provide an angular sensor which makes it possible to determine the position of rotation of the rotating element of the angular sensor in a simple and reliable manner.

SUMMARY OF THE INVENTION

The object is achieved by an angular sensor as set forth hereinafter. Advantageous embodiments of the angular sensor are the subject matter of the dependent claims.

According to the invention, an angular sensor of the type mentioned at the beginning is configured in that the angular sensor has a first excitation circuit which generates a first excitation signal, the angular sensor has a first divider circuit which guides the first excitation signal generated by the first excitation circuit partially as a first outgoing signal to a first transceiving antenna fixed to the base body and partially as a first base signal to an evaluation circuit of the angular sensor, the angular sensor has a first waveguide which circulates in an annular manner about the axis of rotation, the first transceiving antenna emits a first electromagnetic wave into the first waveguide on the basis of the first outgoing signal supplied to it which then propagates in the first waveguide in both directions, the rotating element comprises a first termination element at one point along its circumference which protrudes into the first waveguide, the first termination element is designed so as to be reflective on at least one side in such a way that the incoming first electromagnetic wave is reflected on the reflective side of the first termination element and returns to the first transceiving antenna in the first waveguide, the reflected first electromagnetic wave is received by the first transceiving antenna and a first receiving signal generated thereby is supplied to the evaluation circuit and the evaluation circuit determines a first position of rotation of the rotating element in relation to a reference position of rotation by evaluating the first base signal supplied to it and the first receiving signal in a first resolution region.

Thus, in essence, a linear position sensor of the type known, for example, from DE 10 2013 202 765 A1 is modified in such a way that it operates as an angular sensor. For this purpose, the linear waveguide described in DE 10 2013 202 765 A1 is circular in design. The distance between the termination element and the transceiving antenna is varied by rotating the rotating element around the axis of rotation, wherein the transceiving antenna does not change its location on the base body.

It is possible that the first waveguide is fixed to the base body. In this case, the first termination element is displaced during the rotation of the rotating element in the first waveguide. Preferably, however, the first waveguide is arranged on the rotating element. This makes it possible for the first termination element to be fixed in the first waveguide. In this case, the first waveguide has a first slot circulating in an annular manner about the axis of rotation and the first transceiving antenna is arranged on the base body in such a way that it protrudes into the first slot. This results in a particularly good coupling of the first transceiving antenna to the first waveguide.

Preferably, the first termination element is designed to be absorbent on its side opposite the reflective side of the first termination element. As a result, it is possible to detect the reflected first electromagnetic wave properly at virtually every position of rotation. If, on the other hand, the first termination element is also designed to be reflective on its side opposite the reflective side of the first termination element, this is possible only at a few angular positions. However, this may also be sufficient in some cases.

The evaluation circuit can be designed in particular as a circuit operating according to the 6-port method with respect to the evaluation of the first base signal and of the first receiving signal. In this case, a very simple highly accurate determination of the phase offset between the first base signal and the first receiving signal and thus correspondingly a very simple highly accurate determination of the associated first position of rotation is possible.

The 6-port method and the associated circuit are generally known as such. Reference may be made—purely by way of example—to the following specialist articles:

"Six-Port Technology for Precise Geometrical Measurement Applications—an Overview" by Alexander Koelpin et al., published in the Proceedings of the 43rd European Microwave Conference, 7-10 Oct. 2013, Nuremberg, Germany, "Wide-Range, Dual Six-Port based Direction-Of-Arrival Detector" by Gabor Vinci et al., The 7th German Microwave Conference (GeMiC), Ilmenau 2012, pages 1 to 4, and "Dual Tone Approach for Unambiguous Six-Port based Interferometric Distance Measurements" by S. Lindner et al., Microwave Symposium Digest, Seattle 2013 IEEE MTTS International.

The first resolution region is the angular range hi which the rotational position of the rotary element relative to the reference rotational position can be determined by evaluating only the first base signal and the first received signal. The first resolution region results from the frequency of the first excitation signal or the corresponding wavelength in conjunction with the distance of the first waveguide from the axis of rotation. It is possible that the first resolution region extends over at least 360°. In some cases—in particular, when controlling electric machines—however, it may alternatively be sufficient for the first resolution region to extend over—in this case exactly—360°/n, wherein n is a natural number above 1.

In other cases—regardless of the extent of the first resolution region as such—it is necessary to determine a resulting position of rotation over a resulting resolution region that is greater than the first resolution region. In the simplest case, this can be achieved in that phase overflows are detected and counted during the rotation of the rotating element. However, other approaches are also feasible.

For example, it is possible that the angular sensor has a second excitation circuit which generates a second excitation signal, the angular sensor has a second divider circuit which guides the second excitation signal generated by the second excitation circuit partially as a second outgoing signal to a second transceiving antenna fixed to the base body and partially as a second base signal to the evaluation circuit, the angular sensor comprises a second waveguide which circulates in an annular manner about the axis of rotation, on the basis of the second outgoing signal supplied to it, the second transceiving antenna emits a second electromagnetic wave into the second waveguide which then propagates in the second waveguide in both directions, the rotating element comprises a second termination element which protrudes into the second waveguide, the second termination element is designed so as to be reflective on at least one side in such a way that the incoming second electromagnetic wave is reflected on the reflective side of the second termination element and returns to the second transceiving antenna in the second waveguide, the reflected second electromagnetic wave is received by the second transceiving antenna and a second receiving signal generated thereby is supplied to the evaluation circuit, the evaluation circuit determines a second position of rotation of the rotating element in relation to the reference position of rotation by evaluating the second base signal supplied to it and the second receiving signal in a second resolution region and the evaluation circuit determines a resulting position of rotation of the rotating element on the basis of the first and the second position of rotation in a resulting resolution region.

It is possible that the second waveguide is fixed to the base body. Preferably, however, the second waveguide is arranged on the rotating element. The above explanations with respect to the first waveguide can be used in an analogous manner.

In individual cases, the second transceiving antenna and the second waveguide may be identical to the first transceiving antenna and the first waveguide. In this case, the frequencies of the two excitation signals must necessarily differ from one another. It is also possible that although the second transceiving antenna is a different antenna from the first transceiving antenna, the second waveguide is identical to the first waveguide. In this case too, the frequencies of the two excitation signals must necessarily differ from one another. As a rule, the second transceiving antenna and the second waveguide are different elements from the first transceiving antenna and the first waveguide. In this case too, the frequencies of the two excitation signals preferably differ from one another. However, this is not absolutely necessary in this case.

Different advantages can be achieved by this embodiment (different waveguides from one another and different transceiving antennae from one another). In particular, it is possible that seen in the circumferential direction around the axis of rotation the first and the second transceiving antenna are arranged on the base body and the first and the second termination element on the rotating element in such a way that if the first termination element is located in the region of the first transceiving antenna, the second termination element is not located in the region of the second transceiving antenna.

This solves the following problem: when using only a single waveguide and only a single termination element, there is a small angular range in which the sensor arrangement does not operate properly. This is the angular range within which the first termination element is located in the region of the first transceiving antenna. If a further transceiving antenna is used, however, a small angular range exists with respect to this further transceiving antenna in which the sensor arrangement does not operate properly. However, it is readily possible to arrange the two transceiving antennae in such a way that when one sensor arrangement does not operate properly, the other sensor arrangement operates properly and vice versa. Precisely this can be achieved by means of the above-mentioned embodiment.

Furthermore, it is possible and also preferred that the second excitation signal has a frequency different from a frequency of the first excitation signal. As a result, the resulting resolution region can be enlarged, often even significantly. It can even be enlarged to such an extent that the resulting resolution region extends over at least 360°. The corresponding principles for measuring range extension are known as such for linear distance measuring systems. Reference may be made to the aforementioned scientific paper "Dual Tone Approach for Unambiguous Six-Port based Interferometric Distance Measurements" by S. Lindner et al.

BRIEF DESCRIPTION OF THE DRAWING

The properties, features and advantages of this invention described above, as well as the manner in which they are achieved, will be more clearly understood in connection with the following description of the exemplary embodiments which are explained in more detail in connection with the diagrams. The diagrams show a diagrammatic view of.

DETAILED DESCRIPTION OF PREFERRED EMBODIMENTS

Figure 1:
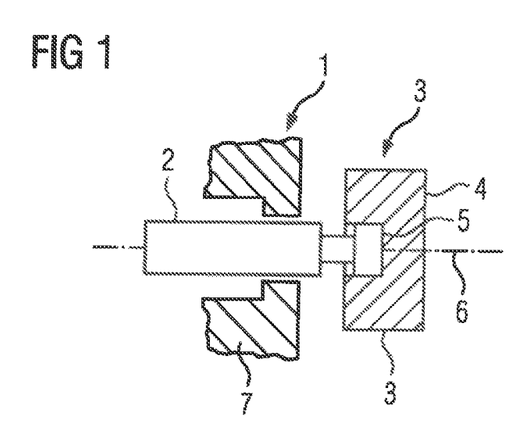
FIG. 1 a machine with an angular sensor.

According to FIG. 1, a machine 1 has a shaft 2 whose angle of rotation or position of rotation α is to be detected. An angular sensor 3 is provided for this purpose. According to FIGS. 1 and 2, the angular sensor 3 has a base body 4 in which a rotating element 5 is mounted. The rotating element 5 can thereby be rotated about an axis of rotation 6, i.e. can be rotated by any angle greater than as well as smaller than 360°. The rotating element 5 can thus be rotated over any number of complete rotations in principle. The base body 4 can be connected—for example, via screws—to a housing 7 of the machine 1. The rotating element 5 can be connected—for example, likewise via screws—to the shaft 2 of the machine 1. The rotating elements 5 are connected to the shaft 2 of the machine 1 in such a way that the axis of rotation 6 coincides with the axis of rotation of the shaft 2 of the machine 1 as well as possible. For clarification, it is pointed out that, with regard to the shaft 2 of the machine 1, the term "shaft" is used in the sense of the mechanical element, not in the sense of a propagating oscillation.

To the extent that the terms "axial", "radial" and "tangential" are used hereinafter, they are always related to the axis of rotation 6. "Axial" is a direction parallel to the axis of rotation 6, "Radial" is a direction orthogonal to the axis of rotation 6 directly towards or away from the axis of rotation 6. "Tangential" is a direction that is both orthogonal to the axial direction as well as orthogonal to the radial direction. "Tangential" is therefore a direction which is directed in a circular manner around the axis of rotation 6 at a constant axial position and at a constant radial distance.

The angular sensor 3 has a waveguide 8. The waveguide 8 circulates in an annular manner around the axis of rotation 6, It thus forms a closed ring which rotates completely through 360°. The waveguide 8 is furthermore preferably arranged on the rotating element 5. In this case, the waveguide 8 has a slot 9 which circulates in an annular manner about the axis of rotation 6. The slot 9 also circulates completely around the axis of rotation 6. It is therefore not interrupted anywhere. In accordance with the illustration in FIGS. 3 and 4, the slot 9 can be arranged in such a way that it is open in the axial direction of the axis of rotation 6. Alternatively, it can be open in the radial direction of the axis of rotation 6, Other directions are also possible.

Figure 5:
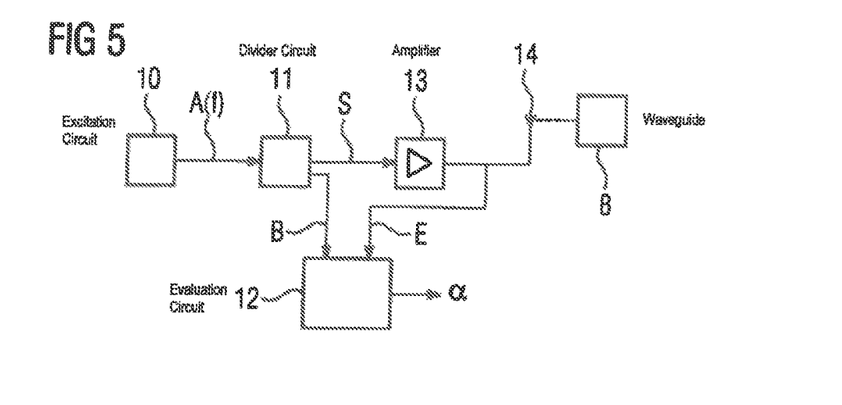
FIG. 5 an associated circuit arrangement of the angular sensor.

In order to detect the position of rotation α, the angular sensor 3 has an excitation circuit 10, in accordance with the illustration in FIG. 5. The excitation circuit 10 generates an excitation signal A. The excitation signal A has a frequency f. The frequency f is in the high-frequency range, usually above 1 GHz, often even above 10 GHz, for example, at 12, 24 or 60 GHz. It can be predefined or adjustable. In any case, however, its exact value is known at all times. Corresponding embodiments which can generate the excitation signal A with high precision with the frequency f are known to experts for example, in the form of PLLs (Phase Locked Loop) in combination with VCOs (Voltage Controlled Oscillator) and other embodiments.

Figure 3:
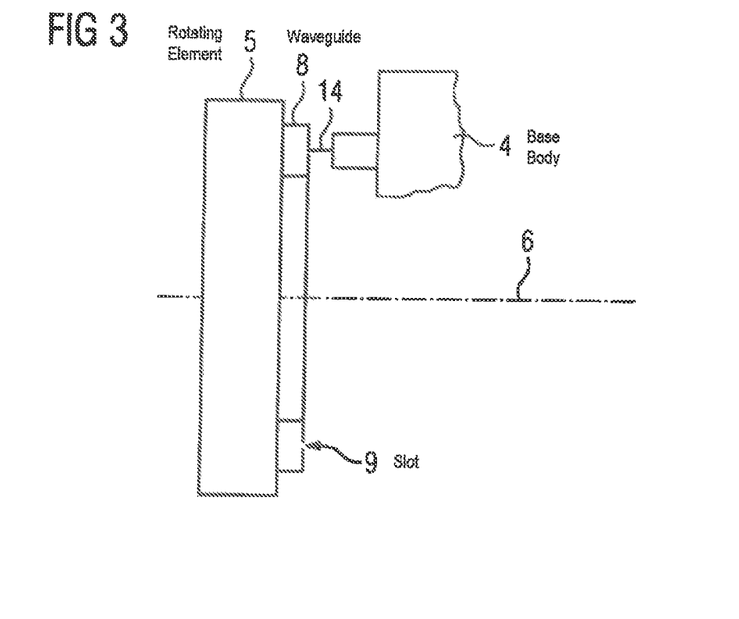
FIG. 3 a rotating element of the angular sensor from FIG. 2 from the side.

The generated excitation signal A is supplied to a divider circuit 11. The divider circuit 11 divides the excitation signal A into two signals, namely on the one hand, into an outgoing signal S and on the other hand, into a base signal B. The divider circuit 11 supplies the base signal B to an evaluation circuit 12. The outgoing signal S supplies the divider circuit 11—possibly via an amplifier 13—to a transceiving antenna 14. The transceiving antenna 14 is arranged on the base body 4. The transceiving antenna 14 emits an electromagnetic wave into the waveguide 8 based on the outgoing signal S supplied to it. In order to be able to couple the electromagnetic wave into the waveguide 8, the transceiving antenna 14 can protrude into the slot 9, for example, as shown in FIG. 3. For clarification, with regard to the electromagnetic wave, it is pointed out that the term "shaft" is used in the sense of a propagating oscillation, not in the sense of a mechanical element.

Figure 4:
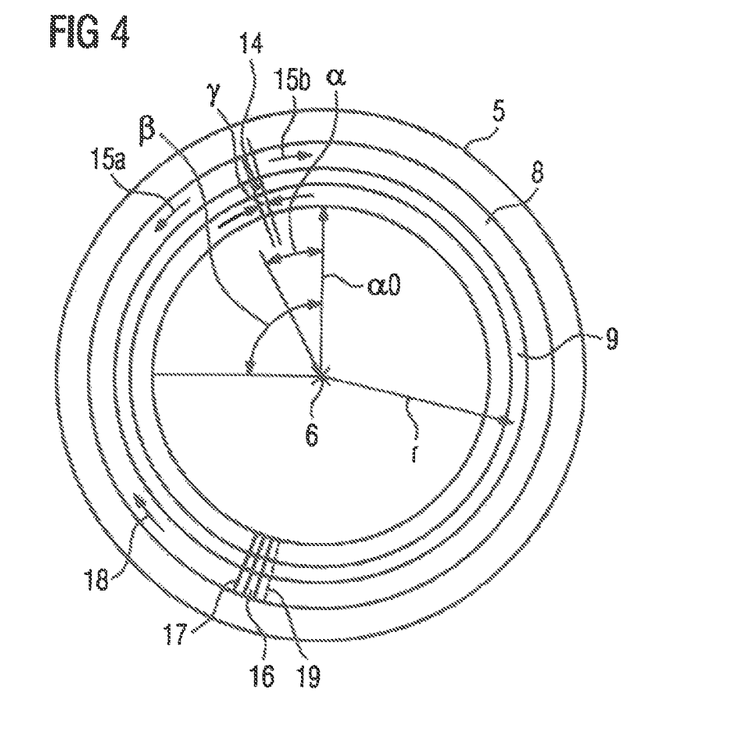
FIG. 4 the rotating element from FIG. 3 from the front.

The electromagnetic wave propagates in both directions in the waveguide 8. In FIG. 4, this is illustrated by arrows 15a, 15b, which designate the corresponding waves.

The rotating element 5 has a termination element 16. The termination element 16 protrudes into the waveguide 8, The two propagating waves 15a, 15b impinge on the two sides of the termination element 16. The termination element 16 is designed so as to be reflective on at least one side. This is indicated in FIG. 4 by a solid line 17, The electromagnetic wave 15a arriving on the reflective side of the termination element 16 is therefore reflected at the termination element 16 and then returns to the transceiving antenna 14 as a reflected wave 18 in the waveguide 8. On the other side, the termination element 16 is preferably absorbent in design. This is indicated in FIG. 4 by a dashed line 19. The electromagnetic wave 15b arriving on the absorbent side of the termination element 16 is therefore absorbed at the termination element 16 so that a reflected wave does not return to the transceiving antenna 14 from there.

The transceiving antenna 14 receives the reflected electromagnetic wave 18. It thereby generates a receiving signal E which it supplies to the evaluation circuit 12. The evaluation circuit 12 then determines the position of rotation α by evaluating the base signal B and the receiving signal E. In particular, the evaluation circuit 12 can determine the phase position φ of the receiving signal E relative to the base signal B and determine the associated position of rotation α therefrom in conjunction with the known radius r of the waveguide 8. This will be explained in more detail below.

The receiving signal E has a phase offset relative to the base signal B when the position of rotation α of the rotating element 5 is equal to a reference position of rotation α0, Without loss of generality, it can be assumed that the phase offset has the value 0. When the rotating element 5 is rotated by the angle α, the path that the propagating wave 15a and the reflected wave 18 must travel is changed by $$\delta x = r \cdot 2\pi \cdot \frac{\alpha}{360°} \tag{1}$$

As this path must be covered by both the propagating and reflected wave 15a, 18, this results in a phase offset φ (or generally a change of the phase offset φ) of $$\varphi = \frac{2\delta x}{\lambda} \cdot 2\pi \tag{2}$$

As, furthermore, the wavelength A are coupled to one another via the relationship $$\lambda \cdot f = c \tag{3}$$

(where c propagation speed of the waves 15a, 15b, 18), the following relationship between the position of rotation α and the phase position φ can thus be established as a result:

$$\varphi = \frac{\pi^2}{45°} \cdot \frac{f \cdot r}{c} \cdot \alpha \tag{4}$$

At a given position of rotation α, the phase position φ is thus unambiguously determined. However, the evaluation circuit 12 must first determine the phase position φ and then from the phase position φ the position of rotation α. It is easy to determine the phase position φ. For example, the evaluation circuit 12 for determining the phase position φ can be designed as a circuit operating according to the 6-port method. This type of evaluation is generally known. It is very reliable and accurate. However, the phase position φ can only be determined modulo 2π. The evaluation circuit 12 can therefore determine the position of rotation α of the rotating element 5 relative to the reference position of rotation α0 only within a resolution region β. The resolution region β is obtained according to equation 5

$$\beta = \frac{90°}{\pi} \cdot \frac{c}{f \cdot r} \tag{5}$$

It is possible that the resolution region β extends over at least 360°. This is the case when the frequency f and the radius r are matched to one another in such a way that they describe the relationship $$f \cdot r \leq \frac{c}{4\pi} \tag{6}$$

Figure 2:
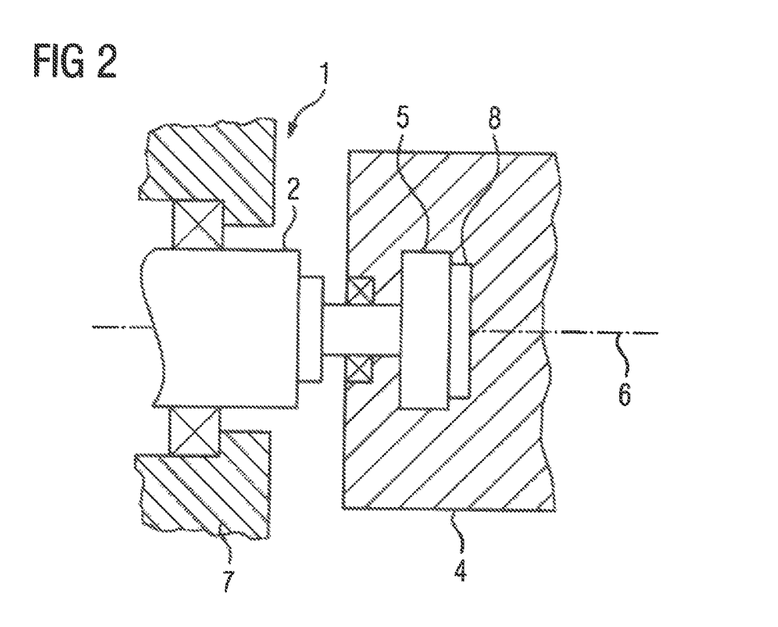
FIG. 2 the angular sensor from HG 1 enlarged.

Otherwise, the position of rotation α over a full revolution of the rotating element 5 is not directly possible by means of the embodiment of the angular sensor 3 according to AG 2, 3 and 4, However, with sufficiently rapid detection and determination of successive phase positions φ, it is possible to detect phase jumps and, in principle, thereby expand the resolution region as desired. Furthermore, it is possible to carry out the measurement of the phase positions φ in quick succession at a plurality of frequencies f and to expand the resolution region β—in principle as desired—by combining the measurement values.

In some cases—in particular when the machine 1 is an electric machine—it can also be sufficient if the resolution region β extends over 360°/n, wherein n is a natural number above 1. In this case, the frequency f and the radius r must be matched to one another in such a way that they have the relationship $$f \cdot r = n \cdot \frac{c}{4\pi} \tag{7}$$

n can in particular be the number of pole pairs of the electric machine.

An embodiment of the angular sensor 3 will be explained hereinafter in connection with AG 6 and 7. The embodiment is based on FIGS. 4 and 5. All the components mentioned there, for example, the waveguide 8 with the slot 9 and the excitation circuit 10, are also present here. The components mentioned also interact in the same manner as discussed above in connection with FIGS. 4 and 5. This situation will therefore not be discussed again below.

In addition, the angular sensor 3 has a further waveguide 8'. The further waveguide 8' likewise circulates in an annular manner about the axis of rotation 6. It thus also forms a closed ring which rotates completely through 360°. The further waveguide 8' is preferably also arranged on the rotating element 5. In this case, the further waveguide 8' also has a slot 9' which circulates in an annular (and complete) manner about the axis of rotation 6. The slot 9' of the further waveguides 8' can be arranged analogously to the slot 9 in such a way that it is open in the axial direction of the axis of rotation 6. Alternatively, it can be open in the radial direction of the axis of rotation 6. Other directions are also possible.

Figure 7:
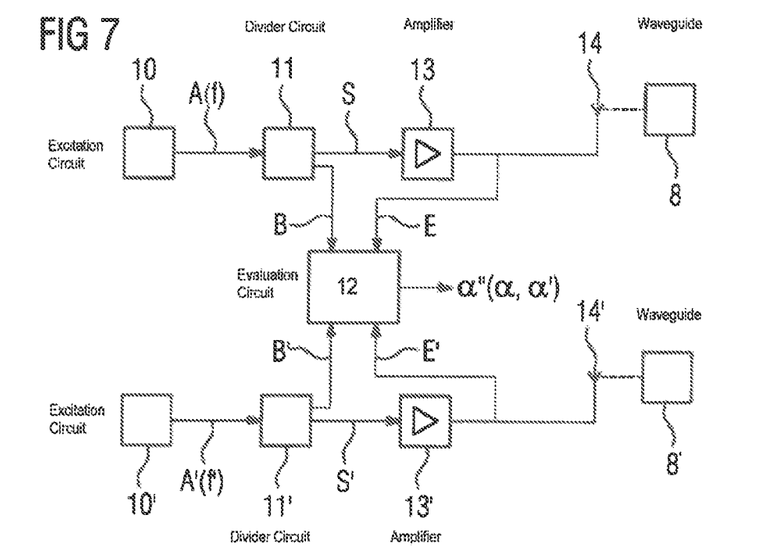
FIG. 7 an associated circuit arrangement of the angular sensor.

Furthermore, in accordance with the illustration in FIG. 7, the angular sensor 3 also has a further excitation circuit 10'. The further excitation circuit 10' likewise generates an excitation signal A'. The further excitation signal A' has a frequency f'. The frequency f' of the further excitation signal A' is likewise in the high-frequency range, usually above 1 GHz, often even above 10 GHz. It can be predefined or adjustable. In any case, however, its exact value is known at all times. As a rule, the frequency f' has a value different from the frequency f. Moreover, the embodiments described above can be applied analogously to the excitation circuit 10.

The generated further excitation signal A' is supplied to a further divider circuit 11'. The further divider circuit 11'— analogous to the divider circuit 11—divides the further excitation signal A' into a further outgoing signal S' and a further base signal B'. The further divider circuit 11' supplies the further base signal B' to the evaluation circuit 12. The further outgoing signal S' supplies the further divider circuit 11' to a further transceiving antenna 14'—possibly via a further amplifier 13'. The further transceiving antenna 14' is likewise arranged on the base body 4. The further transceiving antenna 14' emits a further electromagnetic wave into the further waveguide 8' on the basis of the further outgoing signal S' supplied to it. In order to be able to couple the further electromagnetic wave into the further waveguide 8', the further transceiving antenna 14' can, for example, protrude into the further slot 9'.

This electromagnetic wave—i.e. the electromagnetic wave emitted via the further transceiving antenna 14'— propagates in both directions in the further waveguide 8'. This is shown in FIG. 6 by arrows 15a', 15b' which indicate the corresponding waves.

Figure 6:
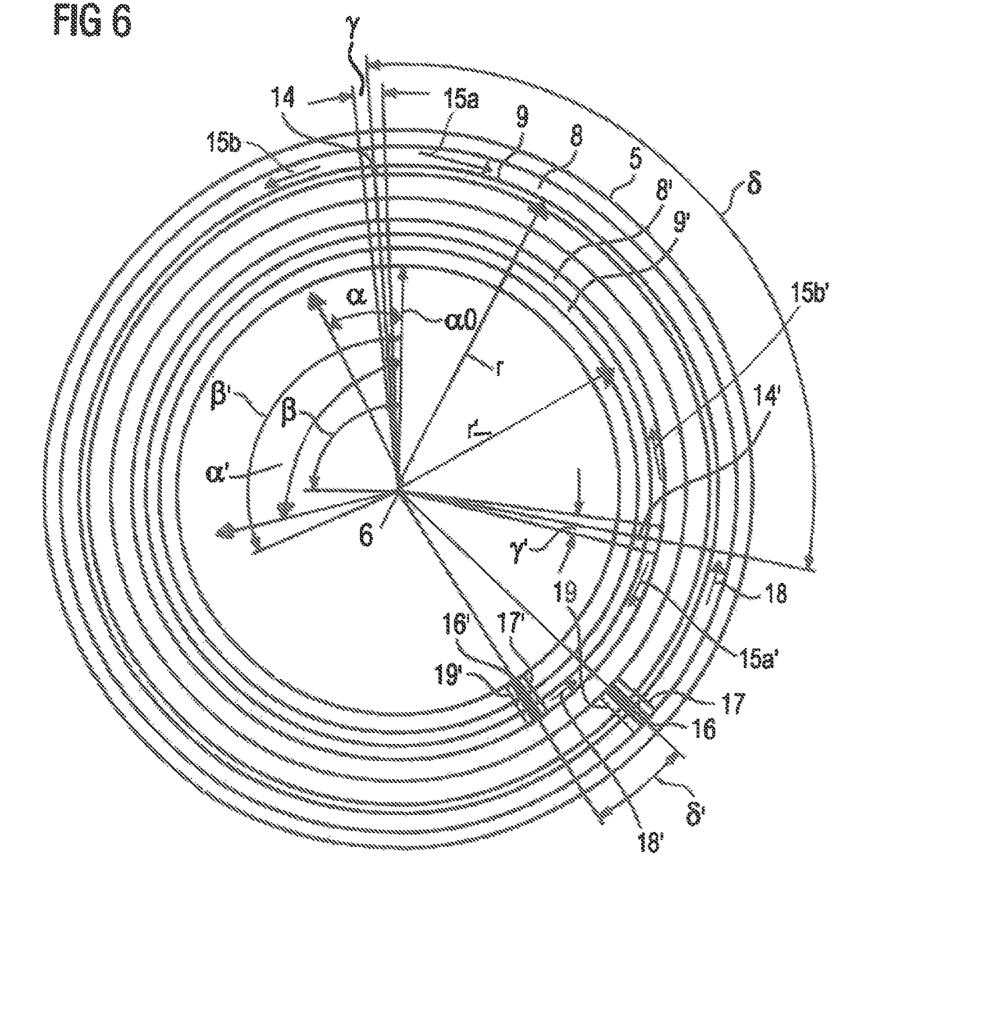
FIG. 6 an embodiment of the rotating element from HG 3 from the front.

In the case of the embodiment according to FIGS. 6 and 7, the rotating element 5 has a termination element 16' at a point along its circumference which protrudes into the further waveguide 8'. The termination element 16' is referred to hereinafter as a further termination element 16'. The two propagating waves 15a', 16b' impinge on the two sides of the further termination elements 16'. The further termination element 16' is designed so as to be reflective on at least one side. This is indicated in FIG. 6 by a solid line 17'. The incoming electromagnetic wave 15a' on the reflective side of the further termination element 16' is therefore reflected on the further termination element 16' and then returns as a reflected wave 18' in the further waveguide 8' to the further transceiving antenna 14'. On the other side, the further termination element 16' is preferably designed to be absorbent. This is indicated in FIG. 6 by a dashed line 19'. The electromagnetic wave 15b' arriving on the absorbent side of the further termination element 16' is therefore absorbed on the further termination element 16' so that a reflected wave does not return to the further transceiving antenna 14' from there.

The further transceiving antenna 14' receives the reflected electromagnetic wave 18'. It thereby generates a further receiving signal E' which it supplies to the evaluation circuit 12. The evaluation circuit 12 then determines a further position of rotation α' by evaluating the further base signal B' and the further receiving signal E'. The evaluation is completely analogous to the evaluation discussed above in connection with FIGS. 4 and 5. The evaluation circuit 12 thus determines a phase position φ' of the further receiving signal E' relative to the further base signal 8' and therefrom in conjunction with the known radius r' of the further waveguide 8', the associated further position of rotation α'. This determination also takes place in a further resolution region β'.

The evaluation is completely analogous to that explained above in connection with FIGS. 4 and 5.

The embodiment according to FIGS. 6 and 7 has various advantages.

One advantage is that a small angular range y exists in the embodiment according to FIGS. 4 and 5, in which a detection of the position of rotation α is not possible. This angular range y exists because the electromagnetic wave cannot be emitted from the transceiving antenna 14 into the waveguide 8 when the termination element 16 is located in the region of the transceiving antenna 14. In an analogous manner, there is a further small angular range y' in which detection of the further position of rotation α' is not possible. However, as shown in FIG. 6, it is readily possible to arrange the further transceiving antenna 14 on the base body 4 in such a manner that when the termination element 16 is located in the region of the transceiving antenna 14, the further termination element 16' is not located in the region of the further transceiving antenna 14'. In particular, it is possible that an angular offset 6 which the transceiving antenna 14 and the further transceiving antenna 14' have relative to one another differs sufficiently from an angular offset 6' which the termination element 16 and the further termination element 16' have relative to one another. The difference between the angular offsets 6, 6' must in particular be greater than the greater of the two angular ranges y, y'. The two angular offsets δ, δ' are related to the axis of rotation 6.

A further advantage is that the frequencies f, f' can differ from one another. As a result, not only do the two determined phase positions φ, φ' differ from one another, but in particular also the individual resolution regions β, β'. By comparing the two determined rotational positions α, α' with one another, the evaluation circuit 12 can therefore— assuming a suitable choice of the frequencies f, f' and the associated radii r, r'—determine a resulting position of rotation α" on the basis of the two determined phase positions φ, φ' and the associated rotational positions α, α' within a resulting resolution region β". The resulting resolution region β" can easily extend over at least 360°. The corresponding principle is known for distances in particular from the aforementioned scientific paper by S. Lindner. The corresponding principles can be transferred directly to angular ranges. It is possible that the radii r, r' have the same value. As a rule, however, the radii r, r' have different values from one another.

In summary, the present invention thus relates to the following facts:

A rotating element 5 is mounted in a base body 4 such that the rotating element 5 can be rotated about an axis of rotation 6. An excitation circuit 10 generates an excitation signal A. A divider circuit 11 guides the excitation signal A partially as an outgoing signal S to a transceiving antenna 14 fixed to the base body 4 and partially as a base signal B to an evaluation circuit 12. The angular sensor 3 comprises a waveguide 8 which circulates in an annular manner about the axis of rotation 6. On the basis of the outgoing signal S, the transceiving antenna 14 emits an electromagnetic wave 15a, 15b into the waveguide 8 which propagates in the waveguide 8 in both directions. The rotating element 5 comprises a termination element 16 which protrudes into the waveguide 8 and is designed so as to be reflective on at least one side in such a way that the incoming electromagnetic wave 15a is reflected on the reflective side of the termination element 16 and returns to the transceiving antenna 14 in the waveguide 8. The reflected wave 18 is received by the transceiving antenna 14. A receiving signal E generated thereby is supplied to the evaluation circuit 12. The evaluation circuit 12 determines a position of rotation $\alpha$ of the rotating element 5 in relation to a reference position of rotation $\alpha 0$ by evaluating the base signal B and the receiving signal E in a resolution region $\beta$.

The present invention has many advantages. In particular, a highly accurate detection of the position of rotation $\alpha$, $\alpha'$ of the rotating element 5 relative to the reference position of rotation $\alpha 0$ is possible in a simple and reliable manner.

Although the invention has been illustrated and described in detail by the preferred exemplary embodiment, the invention is not limited by the disclosed examples and other variations can be derived therefrom by a person skilled in the art without departing from the scope of the invention.

What is claimed is:

1. An angular sensor, comprising:
    a base body;
    a rotating element mounted in the base body for rotation about an axis of rotation, said rotating element comprising a first termination element having a reflective side;
    a first waveguide which circulates in an annular manner about the axis of rotation and in which the first termination element of the rotating element protrudes;
    a first transceiving antenna fixed to the base body;
    a first excitation circuit generating a first excitation signal;
    an evaluating circuit; and
    a first divider circuit dividing the first excitation signal into a first base signal supplied to the evaluation circuit and into a first outgoing signal which is supplied to the first transceiving antenna to emit into the first waveguide in response to the first outgoing signal a first electromagnetic wave which propagates in the first waveguide in two directions, with the first electromagnetic wave being reflected from the reflective side of the first termination element in the first waveguide and returned to and received by the first transceiving antenna which generates in response to the received first electromagnetic wave a first receiving signal for supply to the evaluation circuit, said evaluation circuit determining a first position of rotation of the rotating element in relation to a reference position of rotation by evaluating the first base signal and the first receiving signal in a first resolution region.

2. The angular sensor of claim 1, wherein the first waveguide is arranged on the rotating element and includes a first slot that circulates in an annular manner about the axis of rotation, said first transceiving antenna being arranged on the base body such as to protrude into the first slot.

3. The angular sensor of claim 1, wherein the first termination element comprises an absorbent side opposite the reflective side of the first termination element.

4. The angular sensor of claim 1, wherein the evaluation circuit is configured as a circuit operating according to a 6-port method, when evaluating the first base signal and the first receiving signal.

5. The angular sensor as of claim 1, wherein the first resolution region extends over at least 360°.

6. The angular sensor of claim 1, wherein the first resolution region extends over 360°/n, wherein n is a natural number above 1.

7. The angular sensor of claim 1, further comprising:
    a second waveguide which circulates in an annular manner about the axis of rotation and in which a second termination element of the rotating element protrudes;
    a second transceiving antenna fixed to the base body;
    a second excitation circuit generating a second excitation signal; and
    a second divider circuit dividing the second excitation signal into a second base signal supplied to the evaluation circuit and into a second outgoing signal which is supplied to the second transceiving antenna to emit into the second waveguide in response to the second outgoing signal a second electromagnetic wave which propagates hi the second waveguide in two directions, with the second electromagnetic wave being reflected from a reflective side of the second termination element in the second waveguide and returned to and received by the second transceiving antenna which generates in response to the received second electromagnetic wave a second receiving signal for supply to the evaluation circuit, said evaluation circuit determining a second position of rotation of the rotating element in relation to the reference position of rotation by evaluating the second base signal and the second receiving signal in a second resolution region and determining a resulting position of rotation of the rotating element on the basis of the first and the second position of rotation in a resulting resolution region.

8. The angular sensor of claim 7, wherein viewed in a circumferential direction around the axis of rotation, the first and second transceiving antennas on the base body and the first and second termination elements on the rotating element are arranged in such a way that when the first termination element is located in a region of the first transceiving antenna, the second termination element is not located in a region of the second transceiving antenna.

9. The angular sensor of claim 7, wherein the second excitation signal has a frequency different from a frequency of the first excitation signal.

10. The angular sensor of claim 7, wherein the resulting resolution region extends over at least 360°.

* * * * *